(12) United States Patent
Marwah et al.

(10) Patent No.: US 10,409,795 B2
(45) Date of Patent: Sep. 10, 2019

(54) PREDICATE OFFLOAD OF LARGE OBJECTS

(71) Applicant: ORACLE INTERNATIONAL CORPORATION, Redwood Shores, CA (US)

(72) Inventors: Vineet Marwah, San Ramon, CA (US); Amit Ganesh, San Jose, CA (US); Teck Hua Lee, Belmont, CA (US); Hui Joe Chang, San Jose, CA (US); Zhen Hua Liu, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 13/831,137

(22) Filed: Mar. 14, 2013

(65) Prior Publication Data

US 2014/0280249 A1 Sep. 18, 2014

(51) Int. Cl.
 *G06F 16/22* (2019.01)
(52) U.S. Cl.
 CPC .............................. *G06F 16/2219* (2019.01)
(58) Field of Classification Search
 CPC ......... G60F 17/30914; G06F 17/30914; G06F 16/2219
 See application file for complete search history.

(56) References Cited

U.S. PATENT DOCUMENTS 5,857,203 A * 1/1999 Kauffman ......... G06F 17/30955
5,999,943 A * 12/1999 Nori et al.
6,128,621 A * 10/2000 Weisz (Continued)

FOREIGN PATENT DOCUMENTS

CN 101150483 A 3/2008
JP 2002278704 A 9/2002

(Continued)

OTHER PUBLICATIONS

Banerjee et al., "Oracle8i-the XML Enabled Data Management System", 2000 Proceedings 16th International Conference on Data Engineering.*

(Continued)

*Primary Examiner* — Apu M Mofiz
*Assistant Examiner* — Sheryl L Holland
(74) *Attorney, Agent, or Firm* — Hickman Palermo Becker Bingham LLP

(57) ABSTRACT

In an approach, the database server generates a request for data representing rows of a table, the request identifying one or more data blocks stored on a storage system. The database server then generates metadata describing one or more filtering conditions to be applied to the rows and sends the metadata along with the request to the storage system. The storage system, when applying filtering conditions to a column containing a LOB, determines whether the LOB is stored in-line or out-of-line. If the column contains an out-of-line LOB, the storage system skips the filtering conditions on the column. If the column contains an in-line LOB, the storage system applies the filtering conditions to the column. Upon obtaining the filtered data from the storage system, the database server retrieves the data blocks for out-of-line LOBs and applies the skipped filtering conditions to create a final result set.

29 Claims, 4 Drawing Sheets

(56) References Cited

U.S. PATENT DOCUMENTS

| | | | |
|---|---|---|---|
| 7,031,994 | B2 | 4/2006 | Lao et al. |
| 7,047,253 | B1* | 5/2006 | Murthy et al. |
| 7,096,224 | B2* | 8/2006 | Murthy et al. ............... 707/763 |
| 7,496,589 | B1 | 2/2009 | Jain et al. |
| 8,832,142 | B2 | 9/2014 | Marwah et al. |
| 9,367,642 | B2* | 6/2016 | Agrawal |
| 2002/0078068 | A1* | 6/2002 | Krishnaprasad et al. ................... 707/104.1 |
| 2003/0115324 | A1* | 6/2003 | Blumenau et al. ........... 709/225 |
| 2004/0003087 | A1 | 1/2004 | Chambliss et al. |
| 2004/0064466 | A1* | 4/2004 | Manikutty et al. ........... 707/100 |
| 2004/0215626 | A1 | 10/2004 | Colossi et al. |
| 2005/0055355 | A1* | 3/2005 | Murthy et al. ................ 707/100 |
| 2005/0056520 | A1 | 4/2005 | Dharmapurikar et al. |
| 2006/0047670 | A1* | 3/2006 | Yu et al. ....................... 707/100 |
| 2006/0224451 | A1 | 10/2006 | Kerschbrock et al. |
| 2006/0224551 | A1 | 10/2006 | Lariba-Pey et al. |
| 2007/0124415 | A1 | 5/2007 | Lev-Ran et al. |
| 2007/0198482 | A1* | 8/2007 | Allen ............... G06F 17/30318 |
| 2008/0147599 | A1 | 6/2008 | Young-Lai |
| 2008/0155229 | A1 | 6/2008 | Beyer et al. |
| 2008/0195668 | A1* | 8/2008 | Chandrasekar et al. ... 707/104.1 |
| 2009/0106210 | A1 | 4/2009 | Slezak |
| 2010/0082648 | A1 | 4/2010 | Potapov |
| 2012/0005184 | A1* | 1/2012 | Thilagar et al. ............. 707/706 |
| 2012/0054225 | A1* | 3/2012 | Marwah ............ G06F 17/30477 707/769 |
| 2013/0232190 | A1* | 9/2013 | Miller et al. ................. 709/203 |
| 2014/0337314 | A1 | 11/2014 | Potapov et al. |
| 2015/0244452 | A1 | 8/2015 | Dickie |
| 2016/0092491 | A1 | 3/2016 | Cowling |
| 2016/0092507 | A1 | 3/2016 | Ng et al. |

FOREIGN PATENT DOCUMENTS

| | | |
|---|---|---|
| JP | 2003150419 A | 5/2003 |
| JP | 2004038758 A | 2/2004 |

OTHER PUBLICATIONS

"XQuery 1.0: An XML Query Language", Dec. 14, 2010, W3C.*
"A Technical Overview of the Oracle Exadata Database Machine and Exadata Storage Server", 2012, Oracle.*
Loizos et al., "Improving Join Efficiency with Extended Bloom Filter Operations", AMC, 2007, 8 pages.
U.S. Appl. No. 12/562,984, filed Sep. 18, 2009, Office Action dated Jun. 18, 2013.
U.S. Appl. No. 12/562,984, filed Sep. 18, 2009, Final Office Action dated Nov. 20, 2013.
Ailamaki, Anastassia, et al, "Weaving Relations for Cache Performance," Proceedings of the 27$^{th}$ International Conference on Very Large Data Bases, Rome, Italy, Sep. 11-14, 2001, 14 pages.
Elmasri, et al., "Fundatmentals of Database Systems," Third Edition, Addison-Wesley Longman, Inc., Copyright ©2000, ISBN-0-8053-1755-4, pp. 32, 70, 118, 131-132, 134, 155-159, 170, 252-254, 558, 569-573, 591-592, and 789-790 (26 pgs).
U.S. Appl. No. 14/339,412, filed Jul. 23, 2014, Final Office Action, dated Jul. 14, 2015.
NG, U.S. Appl. No. 14/726,372, filed May 29, 2015, Office Action, dated May 18, 2018.
U.S. Appl. No. 14/339,412, filed Jul. 23, 2014, Notice of Allowance, dated Mar. 10, 2016.

* cited by examiner

PREDICATE OFFLOAD OF LARGE OBJECTS

CROSS-REFERENCE TO RELATED APPLICATIONS

This application is related to Non-Provisional application Ser. No. 12/562,984, filed Sep. 18, 2009, the entire contents of which is hereby incorporated by reference as if fully set forth herein, under 35 U.S.C. § 119(e).

FIELD OF THE INVENTION

The present invention relates to predicate offload of large objects.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Database Servers

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to one or more databases, processing requests by clients to access the one or more databases.

A database comprises data and metadata. From a high-level perspective, that data and metadata is maintained in logical structures, for example, according to relational and/or object-relational database constructs. Database metadata defines database objects, such as tables, object tables, views, or complex types. SQL data definition language ("DDL") instructions are issued to a database server to create or configure database objects.

Generally, data is logically structured within a database as one or more data containers. Each container contains records. The data within each record is organized into one or more fields. In relational database systems, the data containers are typically referred to as tables, the records are referred to as rows, and the fields are referred to as columns. In object oriented databases, the data containers are typically referred to as object types or classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be typically associated with relational or object-relational databases. Thus, the terms "table," "row," and "column" shall be used herein to refer respectively to a data container, a record, and a field.

Storage Systems

Database servers maintain the underlying data for a database in one or more persistent storage systems. These storage systems typically provide the database servers with large capacities of persistent, non-volatile storage in which the database servers may store the underlying data, often in the form of one or more storage devices such as hard disks. One example of such a storage system is a storage array.

Many storage systems are optimized with software or hardware logic for performing low-level, specialized data management functions, such as storage device backup, storage device optimization, striping across multiple individual storage devices, shared data access, block caching, and so on. Accordingly, database servers often rely on storage systems to provide such low-level functions, so that the database servers can utilize their resources for other tasks, such as query compilation and execution, data analysis, and communication with clients.

In many embodiments, the storage systems utilized by database servers constitute little more than one or more simple, linearly addressed, blocked, and persistent storage devices. As such, the storage systems may be oblivious to the logical structures represented by the underlying data they store. Furthermore, interaction between database servers and storage systems may be limited to simple input/output (I/O) requests to read or write ranges of bytes from or to disk.

Thus, while database servers present database data to clients as logical structures such as described above, the underlying data for a database may be stored in different, simpler structures at the storage system. For example, in order for a database server to store data at a conventional hard disk, the database server structures that data to conform to a block structure supported by the hard disk. So, while most clients issue instructions or queries to a database server that refer to data via reference to logical structures such as tables and columns, the database server actually retrieves that data from a storage system in raw blocks. Through the use of various stored metadata, indexes, and headers, the database server is able to interpret the data within the structures retrieved from the storage system as logical tables, rows, and columns. For convenience, structures in which a database's "raw" or underlying data is stored at a storage system shall hereinafter be referred to as data blocks or data units. Techniques described in terms of data blocks or data units should be understood as being equally applicable to other structures for storing raw data at a storage system.

For example, when a database server executes a command that requires access to a logical structure in a database, the database server may utilize mapping data to identify a data block or range of data blocks at a storage system in which the underlying data for that logical structure is stored. The database server may then send a read request to the storage system for the mapped data block(s). In response to the request, the storage system may read the identified data block(s) from storage and send those data block(s) to the database server. The database server may then interpret the data block(s) as logical rows and columns of a table. The database server executes the command based on its interpretation of the data block(s) as logical rows and columns.

The time required to request and retrieve data blocks from a storage system represents a significant amount of the time required for a database server to execute a database command. Unfortunately, in many operations, some or even all of certain data blocks retrieved from a storage system may not be relevant to the execution of the database command. For example, a client may request data for only a specific column of a table. Because of the underlying data block structure in which the table is stored at the storage system, the database server may be required to request data blocks comprised of data not just for the requested column, but for other columns as well. The database server will then discard the data for the non-requested columns. Thus, the transfer of data for non-requested columns was unnecessary.

As another example, a query may include certain predicate conditions that cause the database server to filter data from the result set. For instance, the query may request all rows whose "color" column value is "red." Unfortunately, without retrieving all of the underlying data for the table, the database server has no way of knowing which rows satisfy such a predicate. There may be, for example, only 1 row in a 100,000 row table that satisfies the predicate. To find the row, the database server must nonetheless retrieve from the storage system every data block for the table, even though most of them will be irrelevant to the query.

Large Objects

Conceptually, data can be classified into one of the following categories, simple structured data, complex structured data, semi-structured data and unstructured data. Simple structured data represents data that can be organized into tables. Traditionally, databases adhering to the relational model have had great success at dealing with simple structured data. Complex structured data represents data that is complex in nature and well-suited for object-relational constructs such as collections, references, and user defined data types. Semi-structured data represents data that has a logical structure, but the structure is not typically used by the database to define logical storage for the data. For example, an SQL-based database system may store XML documents for processing by an application or external service. Unstructured data represents data that cannot be broken down into smaller logical structures. For example, unstructured data may include a photographic image stored as a binary file on the database.

While simple structured data and complex structured data can be broken down into smaller logical structures, semi-structured data and unstructured data are typically stored as a single logical unit. These logical units are often referred to as Large Objects (LOBs), since the data stored within, as a result of their indivisibility, can reach arbitrarily large sizes. In many cases, database systems support specialized variants of LOBs for specific types of data. For example, Character Large Objects (CLOBs) may be used to store large amount of character data and Binary Large Objects (BLOBs) may be used to store large amounts of binary data.

In one approach, LOBs are stored inline as a column of a database table. Meaning, when the database system retrieves the physical blocks representing the column, the blocks contain the actual data of the LOB. However, databases often have a restriction on the amount of data that a column may hold. LOBs which exceed the column's storage capacity are instead stored out-of-line. Meaning, when the database server attempts to retrieve the LOB, the physical blocks representing the column store additional references which must be followed to retrieve the LOB's actual data. In some cases, the database server may have to follow many layers of references before reaching the blocks storing the actual data. As a result, the data blocks on which the LOB's data is stored may be scattered across many different logical structures, or even across different storage systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
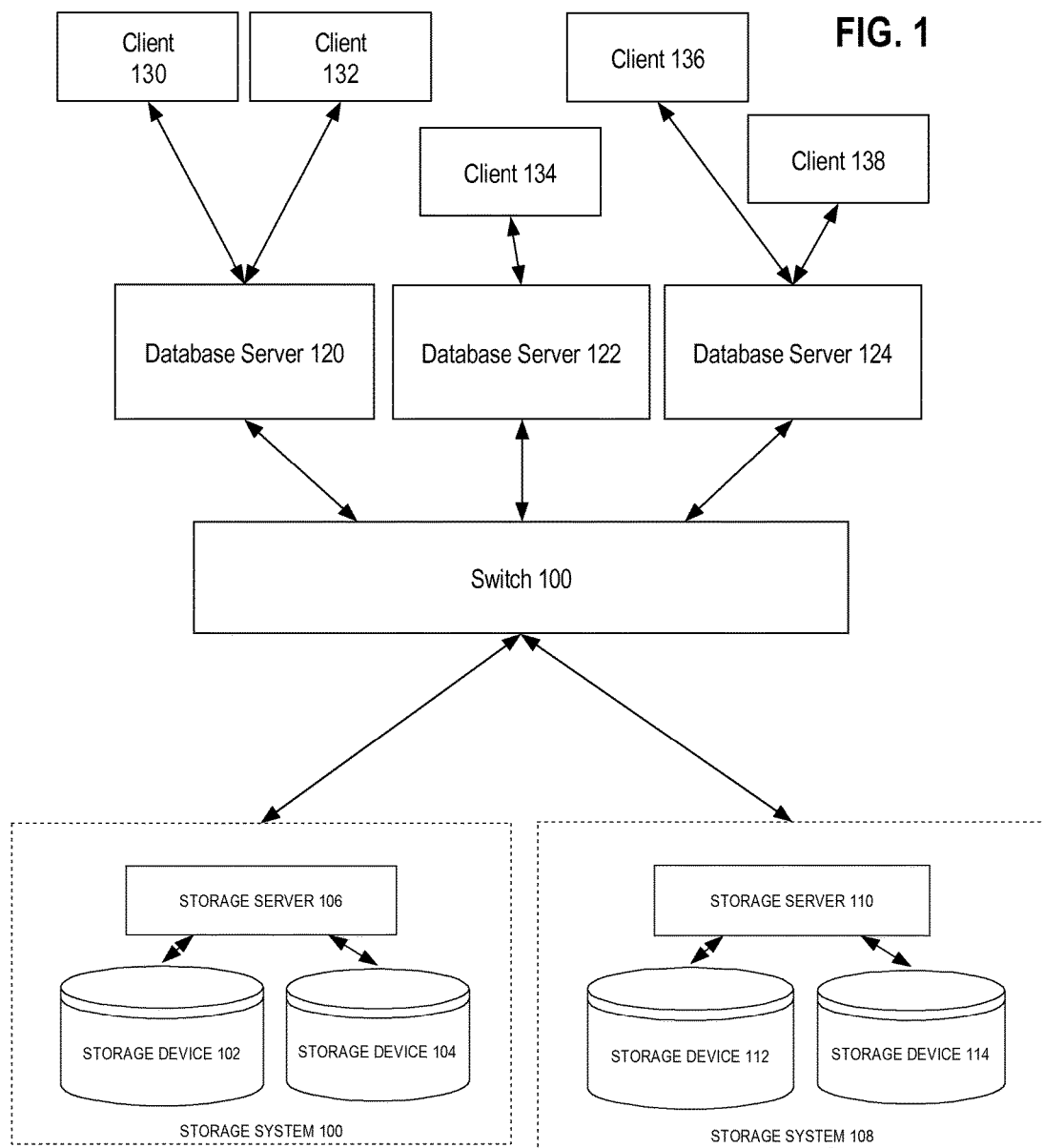
FIG. 1 is a block diagram of a system in which the techniques described herein may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

Techniques are described herein for increasing the efficiency of a database system by utilizing processing resources at a storage system to perform predicate evaluations on large objects which would conventionally be performed by the database server.

In one approach, the database server is configured to, when making a request for a range of data units from a storage system, include metadata describing various filtering conditions on the data being requested. The storage system reads the requested data from disk as normal. However, prior to sending the requested data back to the database server, the storage system filters the requested data based on the metadata, removing a certain amount of data that is guaranteed to be irrelevant to the request. The storage system then returns the filtered data to the database server. Among other benefits of this technique, the database system avoids the unnecessary transfer of a certain amount of data between the storage system and the database server.

However, while the above approach works well with ordinary data, applying the same approach to filter based on LOBs is more complex. As mentioned earlier, the data blocks for out-of-line LOBs may be scattered across many different logical structures and/or storage systems. Thus, the references that must be followed to obtain the out-of-line LOB's data may lead to data blocks stored on a completely different storage system that is not under the control of the storage server which received the request. Consequently, the storage server may not be able to evaluate filtering conditions that apply to out-of-line LOBs due to not having access to all the LOB's data blocks. When LOBs are stored inline the requested blocks actually store the LOB's data, thus allowing the storage server to evaluate the filtering conditions.

Since the storage server is unable to process filtering conditions on out-of-line LOBs, evaluation of those filtering conditions must be performed by the database server which has global access to the storage systems storing the database's data. In an embodiment, the database server offloads the evaluation of filtering conditions on non-LOBs and in-line LOBs to the storage server, but retains responsibility for evaluating filtering conditions on out-of-line LOBs upon receiving the storage server's filtered results. Thus, the storage server performs significant filtering on the data prior to the database server retrieving the out-of-line LOB's and evaluating the remaining filtering conditions.

In an embodiment, the database server generates a request for data representing rows of a table, the request identifying one or more data blocks stored on a storage system. The database server then generates metadata describing one or more filtering conditions to be applied to the rows and sends the metadata along with the request to the storage system. The storage system, when applying filtering conditions to a column containing a LOB, determines whether the LOB is stored in-line or out-of-line. If the column contains an out-of-line LOB, the storage system skips the filtering conditions on the column. If the column contains an in-line LOB, the storage system applies the filtering conditions to the column. Upon obtaining the filtered data from the storage system, the database server retrieves the data blocks for out-of-line LOBs and applies the skipped filtering conditions to create a final result set.

In an embodiment, the storage server stores specialized logic for evaluating filtering conditions on LOBs. For example, the storage server may store logic for evaluating regular expressions on CLOBs. As another example, the storage server may store logic for executing commands of an XML-based language on CLOBs or BLOBs representing XML documents and evaluating the result.

2.0. Structural Overview

FIG. 1 is a block diagram of a system in which the techniques described herein may be implemented. The system of FIG. 1 and the other example embodiments described below are but some examples of the many different systems in which the techniques described herein may be implemented.

Referring to FIG. 1, storage systems 100, 108 provide storage for data used by several different clients 130, 132, 134, 136 and 138. Those clients make use of storage systems 100, 108 indirectly, by sending database commands to database servers 120, 122 and 124, which in turn distribute I/O requests across storage systems 100, 108 in parallel. While the system of FIG. 1 depicts two storage systems, in other embodiments, the database servers 120-124 may rely on more or less than two storage systems to provide the data requested by clients 130-138.

2.1. Example Database Servers and Clients

Database servers 120-124 may be, for example, database servers that respond to the database commands by performing operations for storing, retrieving, and manipulating data stored on databases spread over storage devices 102, 104, 112, 114. Clients 130-138 may be, for example, database applications that send database commands to database servers 120-124. Clients 130-138 and database servers 120-124 may be implemented by one or more computing devices. Clients 130-138 may each interact with one or more of database servers 120-124 through any of a variety of means, including communications via network or local interfaces. In the illustrated embodiment, clients 130 and 132 interact with database server 120, clients 134 interacts with database server 122, and clients 136 and 138 interact with database server 124. In actual implementations, the number and type of clients that concurrently interact with a database server will likely vary.

As suggested above, the interactions between clients 130-138 and database servers 120-124 typically involve the communication of data in the form of logical structures such as databases and tables. Clients 130-138 send database commands, such as SQL statements, to database servers 120-124, each command referencing certain of these logical structures. In order to respond to many of these database statements, database servers 120-124 must request from storage systems 100, 108 raw data that corresponds to the referenced logical structures, translate that raw data into the referenced logical structures, and perform any operations indicated by the database statements based on the translation. In many cases, database servers 120-124 will return logical structures known as result sets back to clients 130-138 based on the results of performing the operations with respect to the referenced logical structures.

According to an embodiment, database servers 120-124 communicate enhanced I/O requests to storage systems 100, 108. These requests identify not only the location of data units that store raw data required by database servers 120-124, but also various metadata describing operations that storage systems 100, 108 may perform to filter the raw data prior to returning it to database servers 120-124. Such metadata may include, for instance, SQL predicates and metadata describing certain aspects of the logical structure of the raw data in the data units. Database servers 120-124 may, in turn, receive filtered data units from storage systems 100, 108 responsive to the enhanced I/O requests. In an embodiment, the filtered data units received by data servers 120-124 may even be reformatted in other structures, such as row-formatted data.

In some embodiments, enhanced requests and responses may be communicated via an enhanced I/O protocol. An example protocol suitable for such communications is Oracle's iDB protocol, which in turn is based on the reliable datagram socket protocol known as the Zero-loss Zero-copy Datagram Protocol (ZDP).

2.2. Example Storage System

Storage systems 100, 108 are systems for storing, managing, and providing access to data. In an embodiment, storage systems 100, 108 are self-contained computing devices, physically distinct from the one or more computing devices at which database servers 120-124 are implemented. For instance, storage systems 100, 108 may be Exadata cells. However, in other embodiments, physical distinction between storage systems 100, 108 and database servers 120-124 is not necessary.

Storage system 100 comprises at least a storage server component 106 and multiple storage devices 102 and 104. Storage system 108 comprises at least a storage server component 110 and multiple storage devices 112 and 114. Storage devices 102, 104, 112, 114 are persistent, non-volatile memories upon which is stored raw data organized into data units, such as data blocks, extents, and segments. For example, each of storage devices 102, 104, 112, 114 may be a conventional hard disk. In an embodiment, the database's data is distributed across the storage devices 102, 104, 112, 114. For example, storage system 100 may be responsible a portion of a database table and storage system 108 may be responsible for the remainder of the database table. As another example, storage system 100 may store a database table and storage system 108 may store data blocks for out-of-line LOBs that are too large to be stored within the database table.

Storage servers 106, 110 comprise one or more subcomponents implementing logic for storing, managing, and providing access to the data stored at storage devices 102, 104 and storage devices 112, 114 respectively. The subcomponents may be implemented, for example, by hardware and/or one or more software processes executing on one or more processors in storage systems 100, 108. Storage servers 106, 110 may comprise a variety of subcomponents, including, for instance, a storage controller and/or storage driver for implementing conventional data I/O operations and management tasks with respect to the data stored in storage devices 102, 104 and storage devices 112, 114 respectively. In some embodiments, the storage servers 106, 110 are configured to access data blocks from their own storage devices, but not data blocks from other storage devices. For example, storage server 106 may not be able to access data blocks from storage devices 112, 114.

As another example subcomponent, storage servers 106, 110 may comprise one or more interfaces for connecting to database servers 120-124 and/or switch 100. The one or more interfaces facilitate the exchange of requests and responsive raw data or filtered data, as discussed above with respect to database servers 120-124.

Storage servers 106, 110 may further comprise a data handling subcomponent coupled to the one or more interfaces. The data handling subcomponent may implement logic for reading raw data from a location in storage devices 102, 104 or storage devices 112, 114 respectively as identified in a received I/O request. Based on metadata received with the I/O request, the data handling subcomponent may further execute an operation for filtering the raw data prior to returning it via the one or more interfaces. For example, storage server 106 may have received, with an I/O request, metadata indicating an SQL predicate to apply to the requested raw data. Server 106 may filter out any of the raw data that does not match the predicate.

In some embodiments, execution of various filtering operations may require that the data handling subcomponent interpret the raw data in such a manner as to recognize at least a portion of the logical structure assigned to the raw data by database servers 120-124. For example, the data handling subcomponent may require logic for understanding which bytes of a data unit correspond to data block headers. The data handling subcomponent may further require logic for determining, based on the data block headers, which bytes of the data block correspond to data block rows and/or logical rows. The data handling subcomponent may further require logic for identifying fields in each data block row or logical row. The data handling subcomponent may then utilize its understanding of the identified logical characteristics of the data to filter, for example, data for data block rows whose fields do not meet certain filtering conditions.

In some embodiments, the data handling subcomponent may also utilize metadata associated with the I/O request to assist in understanding the logical structure of a data unit. For example, to apply a predicate that filters rows based on the value of their "Address" column, the data handling subcomponent must be capable of recognizing which fields of each data unit correspond to the "Address" column. To this end, database servers 120-124 may have sent metadata to storage systems 100, 108 indicating which numbered column is labeled "Address."

Logic for recognizing at least a portion of the logical structure assigned to the raw data by database servers 120-124, and for executing filtering operations based upon a logical structure, may be provided by a database library component. According to an embodiment, the database library component comprises instructions for implementing a subset of the logic implemented by database servers 120-124. The database library component may be optimized to include only that logic which is necessary for storage server 106 to perform a special subset of operations normally performed by a database server. The special subset of operations may be, for instance, only those operations that can be performed efficiently at storage server 106.

The database library component may include instructions for interpreting data units as logical structures, for filtering those logical structures based upon predicates, and for aggregating certain types of data, but may lack instructions for performing a sort or other database operations. The subset of operations may vary depending on the embodiment—for example, storage system 100 may comprise resources that are better suited for certain database operations than the resources available to database servers 120-124, and thus the database library component may include instructions for only those operations. As another example, in embodiments where database servers 120-124 distribute I/O requests across multiple storage systems, any given storage system may only access a portion of the raw data for a table. Thus, while each storage system would be able to efficiently perform operations that involve only a single row of the table, it may be less efficient to use the storage systems to perform operations that involve accessing every row in the table. Thus, the subset of operations in the database library component may omit instructions for operations that involve access to multiple rows of the table.

In some embodiments, the database library component stores logic for evaluating predicates on data blocks representing LOBs. For example, the logic may take the form of one or more functions which evaluate to true or false based on the LOB's data. In some cases the logic may require additional inputs, which the database servers 120-124 provide to the storage servers 106, 110 as metadata in the I/O request.

In one embodiment, the database library component contains logic for performing regular expressions on CLOBS. For convenience, the following example will assume regular expressions adhere to the IEEE POSIX Basic Regular Expressions (BRE) standard, but the techniques described herein are not limited regular expressions adhering to the BRE standard. For example, a command received by the database servers 120-124 may specify a predicate that evaluates whether a column containing a CLOB matches the regular expression "c.t" ("cat", "cbt", "cct", etc.). The database servers 120-124 provide metadata in the I/O request for the table identifying the column and the regular expression to be applied on the column for each row. The storage servers 106, 110 then filter the rows by applying the regular expression logic stored in the database library component and return only rows where the CLOB matches the regular expression "c.t".

In another embodiment, the database library component contains logic for evaluating predicates on LOBs storing XML data. For example, an XML document may be stored as a CLOB and the database library component may store logic for executing instructions of an XML-based language (e.g. XQuery, XQueryX, etc.) on the CLOB. The database servers 120-124 may receive a command specifying a column storing an XML document, one or more instructions of an XML-based language that returns a result when executed, and a predicate that evaluates the result. The database servers 120-124 provide the aforementioned information to the storage servers 106, 110 as metadata in the I/O request. The storage servers 106, 110 then filter rows by executing the instructions against the XML documents and returning only the rows where the predicate evaluates to true. For example, the instructions may return an attribute of the XML document and the predicate may compare whether the attribute matches a particular value. In some cases, XML documents are stored in a format known as Binary XML, a compact representation created by tokenizing XML documents and replacing the tokens with shorter binary identifiers to reduce the cost of parsing. Thus, as another example, a binary XML document may be stored as a BLOB and the database library component may store logic for evaluating instructions of an XML-based language on the BLOB.

In some embodiments, logic for evaluating predicates on LOBs stored in the database library component distinguishes between in-line LOBs and out-of-line LOBs. For example, the logic may pass through (evaluate to true) when the predicates apply to an out-of-line LOB, thus delaying actual evaluation of the predicates for later performance by the database servers 120-124. However, when the logic encounters an in-line LOB, the predicates are evaluated normally. In an embodiment, the logic determines whether the LOB is stored in-line or out-of-line by examining metadata For example, each data block may contain data for a number of rows. Each row contains one or more columns. Each column may be associated with metadata stored within the data block containing the corresponding row that describes whether the column stores actual data (in-line LOB) or references to other data blocks (out-of-line LOB) and can be used by the logic to perform the aforementioned determination. In some embodiments, each function stored on the database servers 120-124 for evaluating LOBs has a corresponding function stored on the storage servers 106, 110 that evaluates to true when applied to out-of-line LOBs and otherwise performs the actual predicate evaluation. For convenience, predicate evaluation that passes through on out-of-line LOBs, but performs the evaluation normally on in-line LOBs will be referred to as "LOB storage evaluation".

The various components and subcomponents of storage systems 100, 108 described above illustrate just one example of a structural architecture for storage systems capable of implementing the techniques described in. In other storage systems, the functionality described herein may be provided by a different set of components and subcomponents. Indeed, the division of work between sub-components may vary from embodiment to embodiment. Accordingly, any steps described above as being performed by any component or subcomponent of storage systems 100, 108 will herein after be attributed to a storage system or storage server in general.

3.0. Functional Overview

3.1. Database Server Work Flow

Figure 2:
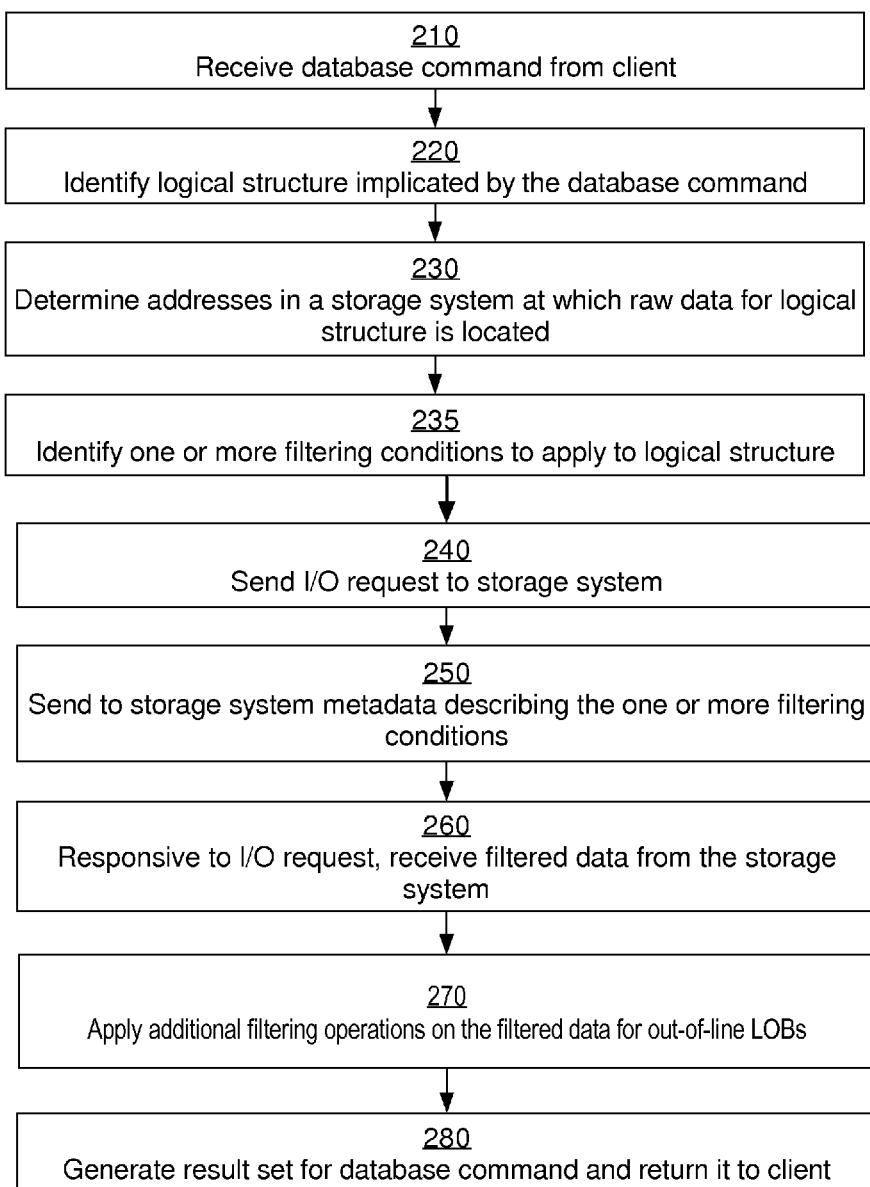
FIG. 2 is a flow chart illustrating a method by which a database server may shift database operations to a storage system.

FIG. 2 is a flow chart 200 illustrating a method by which a database server may shift database operations to a storage system, according to an embodiment of the invention. FIG. 2 is but one example implementation of the techniques described herein. Other embodiments may feature fewer or additional steps, and certain steps may be performed in different orders.

At step 210, a database server receives a database command from the client. For example, database server 120 may receive an SQL statement from client 130.

In response to the database command, at step 220, the database server may identify a logical structure implicated by the database command. For example, database server 120 may determine that execution of the command requires data from a table T1.

In response to identifying an implicated logical structure, at step 230, the database server determines one or more addresses of one or more data units in a storage system at which raw data for the logical structure is located. The determined addresses may be logical or physical, so long as the storage system is capable of identifying physical locations in the storage system that correspond to the addresses. For example, database server 120 may maintain mapping data indicating a logical address of an extent in storage system 100 at which data blocks for table T1 are located. In some embodiments, database server 120 may further translate this logical address into a physical address at a specific storage device.

Further in response to the database command, at step 235, the database server identifies one or more filtering conditions to apply to the logical structure. For example, the database command from client 130 may have included one or more predicates to be evaluated against each row of table T1 so as to determine only a certain subset of rows from T1 to return to the client.

At step 240, the database server sends an I/O request to the storage system. The I/O request identifies one or more data units by the one or more addresses determined in step 230. For example, data server 120 may send an iDB protocol request to storage system 100, via switch 100, to read extents corresponding to table T1.

At step 250, the database server sends to the storage system metadata describing the one or more filtering conditions identified in step 235. This metadata may be sent in the request of step 240. This metadata may also be sent before or after the I/O request of step 240. In such cases, the metadata may be stored at a location accessible to the storage system, and subsequently retrieved by the storage system using a lookup identifier included in the I/O request.

At step 260, responsive to the I/O request, the database server receives filtered data from the storage system. For example, because of its interpretation of the I/O request and metadata sent by the database server, the storage system may have executed steps such as: 1) retrieving the one or more data units from the specified address in a persistent storage of the storage system (which step may, in some cases, be performed by retrieving the data units from a cache within the storage system); and 2) applying the one or more filtering conditions to the retrieved one or more data units.

According to an embodiment, the filtered data is in the same form as the original one or more data units (e.g. a data block), but having had certain data removed (e.g. data block rows that failed to match the filtering conditions). In another embodiment, the database server may be configured to recognize filtered data returned in a structure other than the original structure of the one or more data units. For example, the filtered data may be returned via the iDB protocol in a logical structure—such as a row source, row set, or a table—absent certain data that did not match the filtering conditions. In an embodiment, a filtered logical structure may be wrapped inside a "virtual data block." The virtual data block may comprise, for example, structures similar to other data blocks—such as certain headers and/or transmission information—but with a row set as its payload.

At step 270, the database server performs additional filtering on the out-of-line LOBs. In some embodiments, the storage system uses LOB storage evaluation to evaluate predicates on LOBs, thus skipping actual evaluation of the filtering conditions on out-of-line LOBs. As a result, the filtered data received by the storage server at step 260 may contain data that requires further filtering before the result set can be returned to a client.

For example, the filtered data received from the storage server may include one or more rows. For each row, the database server may examine metadata associated with the LOB columns to which one or more of the filtering conditions apply and determine whether the columns contain actual data or references to additional data blocks. In the event that a column contains actual data, the column stores an in-line LOB and therefore the storage server has already evaluated the filtering conditions pertaining to that column. In the event that the column contains references to additional data blocks, the column stores an out-of-line LOB. Thus, the database server retrieves the additional data blocks for the out-of-line LOB, evaluates the applicable filtering conditions on the column, and filters the row accordingly.

At step 280, based on the filtered data of step 260, the database server generates a result set for the database command and returns it to the client.

3.2. Storage System Work Flow

Figure 3:
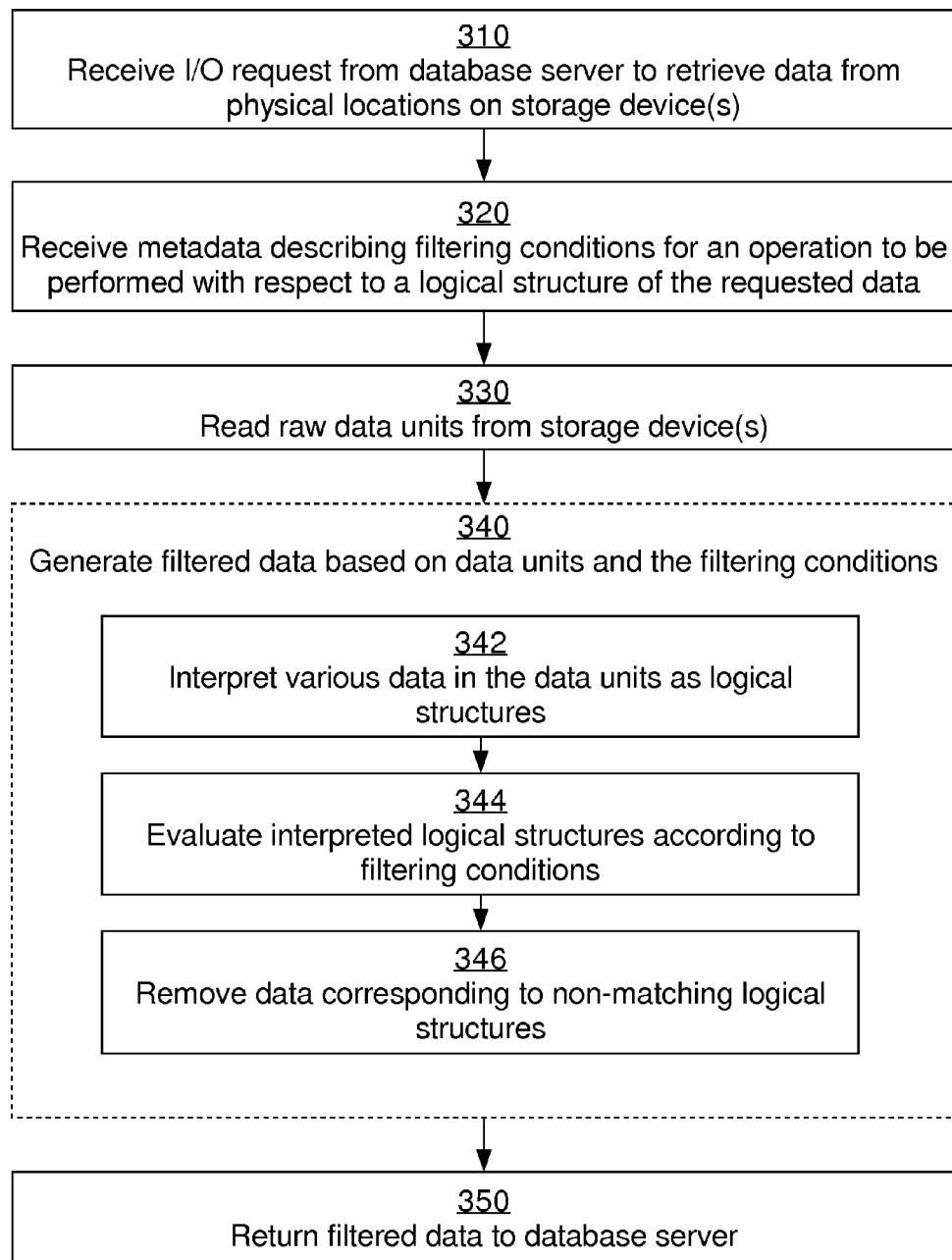
FIG. 3 is a flow chart illustrating a method by which a storage system may pre-filter data requested by a database server.

FIG. 3 is a flow chart 300 illustrating a method by which a storage system may pre-filter data requested by a database server, according to an embodiment of the invention. FIG. 3 is but one example implementation of the techniques described herein. Other embodiments may feature fewer or additional steps, and certain steps may be performed in different orders.

At step 310, a storage server at the storage system receives an I/O request to retrieve data. The request identifies one or more locations of one or more data units in which the requested data is stored at the storage system. For example, the request received by storage server 106 may identify a range of physical addresses on storage device 102 corresponding to a range of data blocks. Such a request may have been sent, for instance, by database server 120 implementing step 240 of FIG. 2. Or, the request may specify logical addresses that the storage server is capable of translating to physical addresses.

At step 320, the storage server receives metadata describing one or more filtering conditions for an operation to be performed with respect to a logical structure of the data requested in step 310. For example, the metadata may include one or more SQL predicates conditioned upon values of a logical column represented by the requested data.

Such a request may have been sent, for instance, by database server 120 implementing step 250 of FIG. 2. In an embodiment, this metadata may be received in the I/O request of step 310. In some embodiments, this metadata may have been separately received from a database server or another source, and stored at a location accessible to the storage system. In such embodiments, the I/O request may include an identifier by which the storage system may locate the appropriate metadata.

In an embodiment, the metadata may have been serialized or encoded by the database server or in transit from the database server. In such embodiments, step 320 thus further entails reconstituting and/or decoding the received metadata.

At step 330, in response to the I/O request, the storage server reads the one or more data units from the indicated one or more locations. For example, storage server 106 may perform a read operation on storage device 102 to fetch the range of data blocks from the indicated physical address.

At step 340, in response to recognizing that the metadata of step 320 was included in or associated with the I/O request, the storage server generates filtered data based on the one or more data units read in step 330 and the one or more filtering conditions. In an embodiment, the storage server generates this filtered data by removing at least some of the data from a working copy of the one or more data units, which working copy then constitutes the filtered data. In another embodiment, the storage server translates the one or more data units to conform to a logical structure that at least partially reflects how the requesting database server will interpret the one or more data units. The storage server then removes certain data from the logical structure, thereby yielding the filtered data.

In either embodiment, the storage server identifies the data to be removed based on the one or more filtering conditions described in the metadata of step 320. Regardless of how the filtered data is constructed, identifying data to be removed may require, at substep 342 of step 340, that the storage server interpret various data in the data units as logical structures, so as to be able to identify which portions of the one or more data units correspond to logical structures that should be pre-filtered from the one or more data units. For example, storage server 106 may identify certain portions of a data block as corresponding to logical rows, and translate those portions into logical rows accordingly.

To assist in interpreting the one or more data units, a subset of the database server's general logic for translating data units into logical structures may be made available to storage server as, for example, instructions in a database library component. Moreover, the metadata received in step 320 may contain further information regarding how the database server interprets the one or more data units—for instance, table names, column names, field types, field sizes, and so on.

At substep 344 of step 340, the filtering conditions are applied to the logical structures identified in step 342. Those logical structures that do not match the filtering conditions are, in step 346, filtered out of the results for the I/O request.

As an example of steps 342-346, storage server may execute instructions in its database library component to locate header information in a data block read during step 340. Based on this header information, storage server may execute instructions in the database library to locate portions of the data blocks that correspond to table rows. Storage server may translate each of these portions into table rows. One of the filtering conditions communicated to the storage server may be the predicate "Year>2000." Storage server 106 thus may utilize metadata sent during step 320 to determine which column of each translated table row corresponds to "Year." Based on this knowledge, storage server identifies which of the translated rows do not have a Year column value greater than 2000 (i.e. which of the translated rows do not match the predicate). All such rows are pre-filtered from the results returned for the I/O request.

In an embodiment, the storage server performs LOB storage evaluation when applying filtering conditions to logical structures associated with LOBs. Thus, the storage server inspects metadata on the physical structure storing the logical structure's data to determine whether the physical structure stores an in-line LOB or an out-of line LOB for the logical structure. In the event that the physical structure stores an in-line LOB, the storage server evaluates the filtering conditions. In the event that the physical structure sores an out-of-line LOB, the storage server passes through on the filtering conditions, thus skipping actual evaluation of the filtering conditions on the LOB. For example, a filtering condition on a column may represent a regular expression. In order to evaluate the filtering condition on the column for a particular row, the storage server determines, within the data block(s) storing the row, whether the data for the column represents actual data (in-line LOB) or references to additional blocks (out-of-line LOB). In the event that the data for the column represents an in-line LOB, the storage server then evaluates the regular expression and filters based on the result. In the event that the data for the column represents an out-of-line LOB, the storage server passes through on the filtering condition and skips the evaluation of the regular expression.

At step 350, the storage server replies to the I/O request with the filtered data. The storage server may structure the filtered data in the original structure of the raw data in persistent storage at the storage system, or it may structure the filtered data according to a logical structure such as a row set, row source, or table. In various embodiments, the reply may further include information about the filtering operations performed by the storage server, as well as various other metadata.

According to an embodiment, the metadata received in step 320 further indicates a subset of columns that are required by the database server. Thus, in step 340, the storage server may also eliminate any data that does not correspond to those columns.

4.0. Other Implementation Examples

4.1. Dealing with Storage Systems that are Incapable of Participating in Pre-Filtering According to an embodiment, at least one of the storage systems relied upon by a database server may lack components or subcomponents necessary to participate in some or all pre-filtering operations. For example, a database server may rely on storage systems 100, 108 and a traditional storage system. Accordingly, the database server is configured to determine whether a given storage system supports a particular filtering operation prior to sending that operation to the storage system. Such a determination may be accomplished, for example, based on stored configuration information acquired in an initial exchange with the storage system. Based on this determination, the database server may determine both whether to send an enhanced I/O request as well as to whom to send an enhanced I/O request. For example, the database server may be configured to favor a conventional storage array when requesting data for operations that do not stand to gain much from pre-filtering, but favor storage systems 100, 108 when requesting data for other operations.

5.0. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
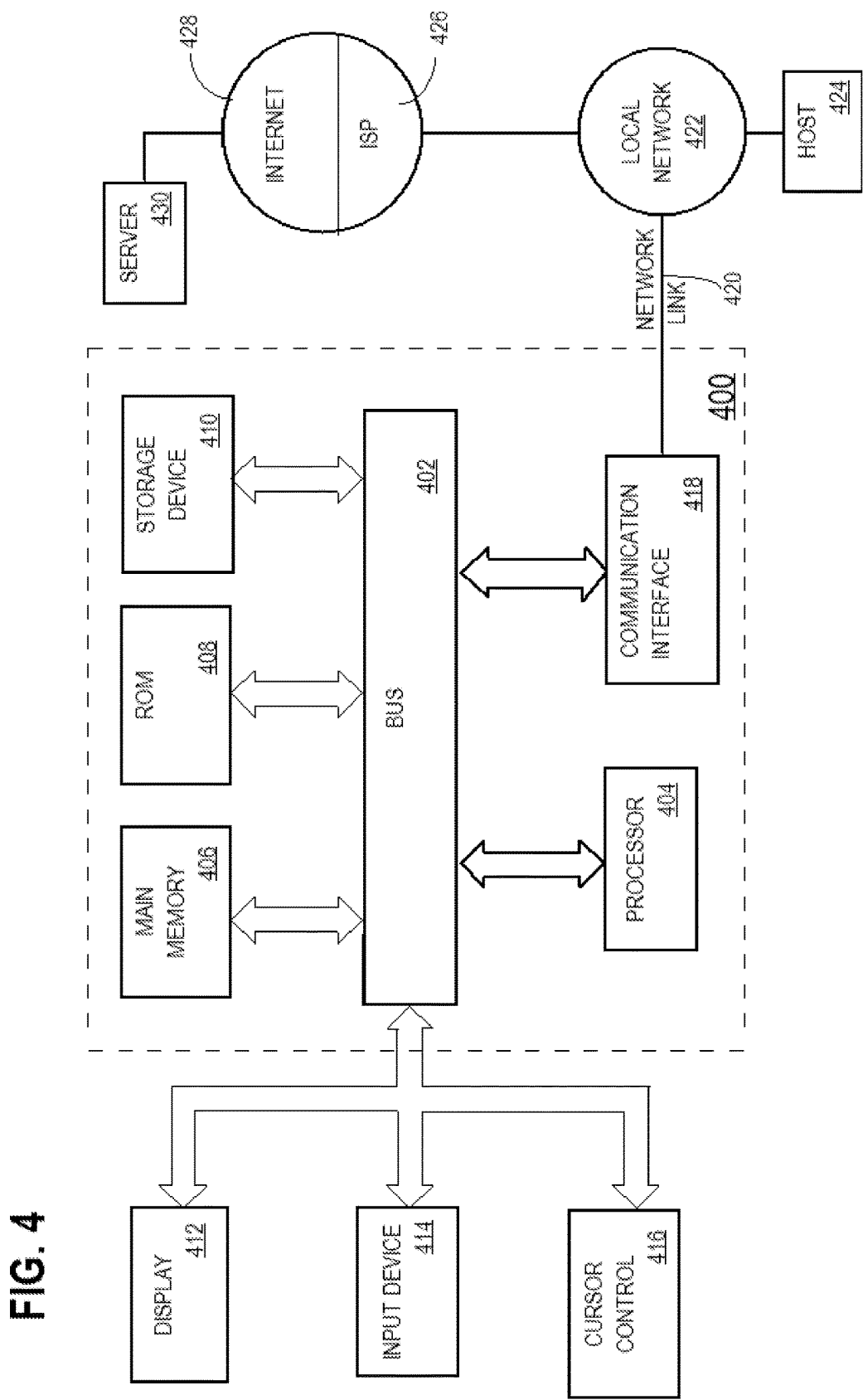
FIG. 4 is a block diagram of a computing device upon which embodiments of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a database server generating a request for data, the request identifying one or more data blocks stored in a data storage subsystem, the one or more data blocks storing one or more rows of a table;
   the database server generating metadata describing one or more filtering conditions to be applied to the one or more rows of the table, the one or more filtering conditions including at least a particular filtering condition requiring evaluation of a particular column of the table, wherein, for each row of the one or more rows, the one or more data blocks store either (a) in-line data comprising a data value of the particular column for the row or (b) out-of-line data comprising one or more references to access one or more other data blocks that relate to the value of the particular column for the row;
   the database server sending the request and the metadata to the data storage subsystem, wherein the metadata, when interpreted by the data storage subsystem, causes the data storage subsystem to generate first response data based on the one or more filtering conditions and the one or more data blocks by, for each row of the one or more rows, at least:
   making a determination of whether the one or more data blocks store in-line data or out-of-line data in the particular column for the row by at least inspecting the metadata in each data block of said one or more data blocks that indicates whether said each data block stores in-line data or out-of-line data in the particular column for the row;
   if the determination is that the one or more data blocks store in-line data in the particular column of the row,
      applying the particular filtering condition to the in-line data in the particular column for the row; and
      including the row in the first response data based on a result of applying the particular filtering condition; and
   if the determination is that the one or more data blocks store out-of-line data in the particular column of the row,
      skip applying the particular filtering condition to the out-of-line data in the particular column for the row; and
      including the row to the first response data.

2. The method of claim 1, wherein at least one data block of the one or more other data blocks is stored on a second data storage subsystem that is inaccessible to the data storage subsystem.

3. The method of claim 1, wherein the data storage subsystem stores logic for evaluating the particular filtering condition.

4. The method of claim 3, wherein the particular column, for each row of the one or more rows, stores one or more characters and the particular filtering condition requires evaluation of a regular expression on the one or more characters.

5. The method of claim 3, wherein the particular column, for each row of the one or more rows, stores an XML document and the particular filtering condition requires execution of one or more instructions which return a result based on the XML document.

6. The method of claim 5, wherein the one or more instructions are written in one or more of: XQuery or XQueryX.

7. The method of claim 1, further comprising the database server sending the final response data to a client.

8. The method of claim 1, further comprising the database server receiving a command specifying the table and the one or more filtering conditions.

9. The method of claim 1, wherein the data storage subsystem determines for each row of the one or more rows, whether the one or more data blocks store in-line data or out-of-line data in the particular column for the row based at least in part on a header of the one or more data blocks.

10. A method comprising:
a data storage subsystem receiving a request from a database server, the request identifying one or more data blocks stored in the data storage subsystem, the one or more data blocks storing one or more rows of a table;
the data storage subsystem receiving metadata from the database server describing one or more filtering conditions to be applied to the one or more rows of the table, the filtering conditions including at least a particular filtering condition requiring evaluation of a particular column of the table, wherein, for each row of the one or more rows, the one or more data blocks store either (a) in-line data comprising a data value of the particular column for the row or (b) out-of-line data comprising one or more references to access one or more other data blocks that that relate to the value of the particular column for the row;
the data storage subsystem generating filtered data by, for each row of the one or more rows,
making a determination of whether the one or more data blocks store in-line data or out-of-line data in the particular column for the row by at least inspecting the metadata in each data block of said one or more data blocks that indicates whether said each data block stores in-line data or out-of-line data in the particular column for the row;
if determination is that the one or more data blocks store in-line data in the particular column of the row, applying the particular filtering condition to the in-line data in the particular column for the row; and
including the row in first response data based on a result of applying the particular filtering condition; and
if the determination is that the one or more data blocks store out-of-line data in the particular column of the row,
skip applying the particular filtering condition to the out-of-line data in the particular column for the row; and
including the row to the first response data.

11. The method of claim 10, wherein the data storage subsystem stores logic for evaluating the particular filtering condition.

12. The method of claim 11, wherein the particular column, for each row of the one or more rows, stores one or more characters and the particular filtering condition requires evaluation of a regular expression on the one or more characters.

13. The method of claim 11, wherein the particular column, for each row of the one or more rows, stores an XML document and the particular filtering condition requires execution of one or more instructions which return a result based on the XML document.

14. The method of claim 13, wherein the one or more instructions are written in one or more of: XQuery or XQueryX.

15. A non-transitory computer-readable medium storing one or more instructions which, when executed by one or more processors, cause the one or more processors to perform steps comprising:
a database server generating a request for data, the request identifying one or more data blocks stored in a data storage subsystem, the one or more data blocks storing one or more rows of a table;
the database server generating metadata describing one or more filtering conditions to be applied to the one or more rows of the table, the one or more filtering conditions including at least a particular filtering condition requiring evaluation of a particular column of the table, wherein, for each row of the one or more rows, the one or more data blocks store either (a) in-line data comprising a data value of the particular column for the row or (b) out-of-line data comprising one or more references to access one or more other data blocks that relate to the value of the particular column for the row;
the database server sending the request and the metadata to the data storage subsystem, wherein the metadata, when interpreted by the data storage subsystem, causes the data storage subsystem to generate first response data based on the one or more filtering conditions and the one or more data blocks by, for each row of the one or more rows, at least:
making a determination of whether the one or more data blocks store in-line data or out-of-line data in the particular column for the row by at least inspecting the metadata in each data block of said one or more data blocks that indicates whether said each data block stores in-line data or out-of-line data in the particular column for the row;
if the determination is that the one or more data blocks store in-line data in the particular column of the row, applying the particular filtering condition to the in-line data value in the particular column for the row;
including the row in the first response data based on a result of applying the particular filtering condition; and
if the determination is that the one or more data units store out-of-line data in the particular column of the row,
skip applying the particular filtering condition to the out-of-line data in the particular column for the row; and
including the row to the first response data.

16. The non-transitory computer-readable medium of claim 15, wherein at least one data block of the one or more

19 other data blocks is stored on a second data storage subsystem that is inaccessible to the data storage subsystem.

17. The non-transitory computer-readable medium of claim 15, wherein the data storage subsystem stores logic for evaluating the particular filtering condition.

18. The non-transitory computer-readable medium of claim 17, wherein the particular column, for each row of the one or more rows, stores one or more characters and the particular filtering condition requires evaluation of a regular expression on the one or more characters.

19. The non-transitory computer-readable medium of claim 17, wherein the particular column, for each row of the one or more rows, stores an XML document and the particular filtering condition requires execution of one or more instructions which return a result based on the XML document.

20. The non-transitory computer-readable medium of claim 19, wherein the one or more instructions are written in one or more of: XQuery or XQueryX.

21. The non-transitory computer-readable medium of claim 15, wherein the steps further comprise the database server sending final response data to a client.

22. The non-transitory computer-readable medium of claim 15, wherein the steps further comprise the database server receiving a command specifying the table and the one or more filtering conditions.

23. The non-transitory computer-readable medium of claim 15, wherein the data storage subsystem determines for each row of the one or more rows, whether the one or more data blocks store in-line data or out-of-line data in the particular column for the row based at least in part on a header of the one or more data blocks.

24. A non-transitory computer-readable medium storing one or more instructions which, when executed by one or more processors, cause the one or more processors to perform steps comprising:
　a data storage subsystem receiving a request from a database server, the request identifying one or more data blocks stored in the data storage subsystem, the one or more data blocks storing one or more rows of a table;
　the data storage subsystem receiving metadata from the database server describing one or more filtering conditions to be applied to the one or more rows of the table, the filtering conditions including at least a particular filtering condition requiring evaluation of a particular column of the table, wherein, for each row of the one or more rows, the one or more data blocks store either (a) in-line data comprising a data value of the particular column for the row or (b) out-of-line data comprising one or more references to access one or more other data blocks that that relate to the value of the particular column for the row;
　the data storage subsystem generating filtered data by, for each row of the one or more rows,
　　making a determination whether the one or more data blocks store in-line data or out-of-line data in the particular column for the row by at least inspecting the metadata in each data block of said one or more data blocks that indicates whether said each data block stores in-line data or out-of-line data in the particular column for the row;
　　if the determination is that the one or more data blocks store in-line data in the particular column of the row,

20 applying the particular filtering condition to the in-line data value in the particular column for the row; and
　　　including the row in first response data based on a result of applying the particular filtering condition; and
　　if the determination is that the one or more data blocks store out-of-line data in the particular column of the row,
　　　skip applying the particular filtering condition to the out-of-line data in the particular column for the row; and
　　including the row to the first response data.

25. The non-transitory computer-readable medium of claim 24, wherein the data storage subsystem stores logic for evaluating the particular filtering condition.

26. The non-transitory computer-readable medium of claim 25, wherein the particular column, for each row of the one or more rows, stores one or more characters and the particular filtering condition requires evaluation of a regular expression on the one or more characters.

27. The non-transitory computer-readable medium of claim 25, wherein the particular column, for each row of the one or more rows, stores an XML document and the particular filtering condition requires execution of one or more instructions which return a result based on the XML document.

28. The non-transitory computer-readable medium of claim 27, wherein the one or more instructions are written in one or more of: XQuery or XQueryX.

29. A method comprising:
　a database server generating a request for data, the request identifying one or more data blocks stored in a data storage subsystem, the one or more data blocks storing one or more rows of a table;
　the database server generating first metadata describing one or more filtering conditions to be applied to the one or more rows of the table, the one or more filtering conditions including at least a particular filtering condition requiring evaluation of a particular column of the table storing LOBs (Large Binary Object), wherein, for each data block of said one or more data blocks, said each data block includes second metadata that specifies, for each row of one or more rows stored in said each data block, whether said each row stores either (a) in-line data comprising a LOB in the particular column for the row or (b) out-of-line data comprising one or more references to access one or more data blocks that store a LOB for the particular column for the row;
　the database server sending the request and the first metadata to the data storage subsystem, wherein the first metadata sent in the request, when interpreted by the data storage subsystem, causes the data storage subsystem to generate first response data based on the one or more filtering conditions and the one or more data blocks by, for each row of the one or more rows, at least:
　　making a determination of whether a data block storing said each row stores a respective LOB of said each row in-line or out-of-line in the particular column for the row by at least inspecting the metadata in each data block of said one or more data blocks that indicates whether said each data block stores in-line data or out-of-line data in the particular column for the row;

if the determination is that said each row stores a respective LOB in-line in the particular column of said each row,
- applying the particular filtering condition to the respective LOB in the particular column for the row; and
- including said each row in the first response data based on a result of applying the particular filtering condition; and if the determination is that said each row stores the respective LOB out-of-line in the particular column of the row,
- skip applying the particular filtering condition to the LOB in the particular column for said each row; and
- including the row to the first response data.

* * * * *